(No Model.) 2 Sheets—Sheet 1.
H. COOK.
AMALGAMATOR.
No. 277,889. Patented May 22, 1883.
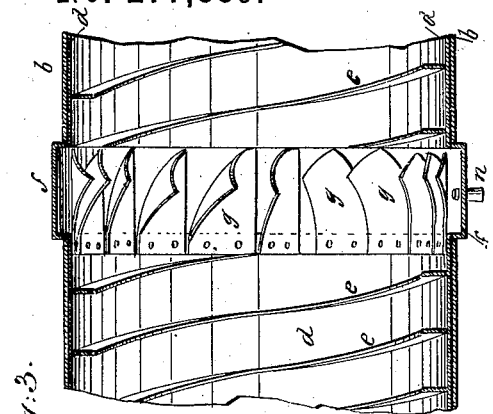
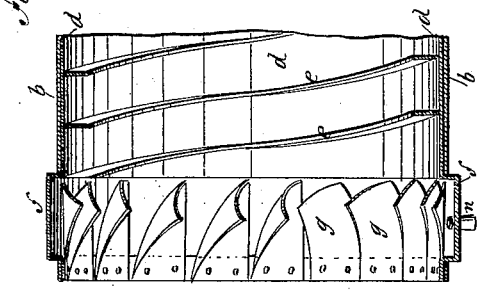
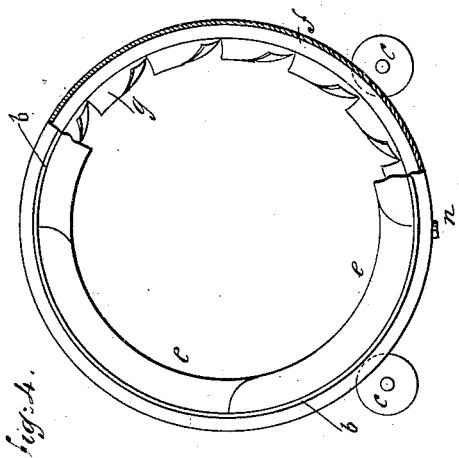
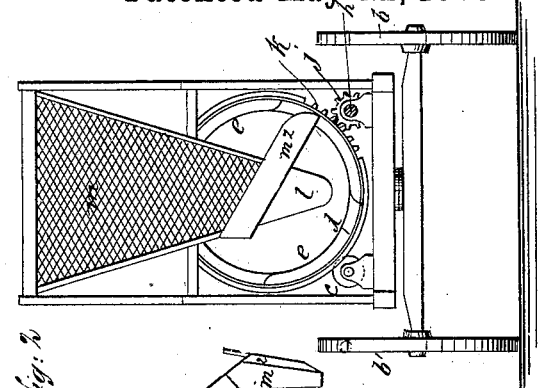
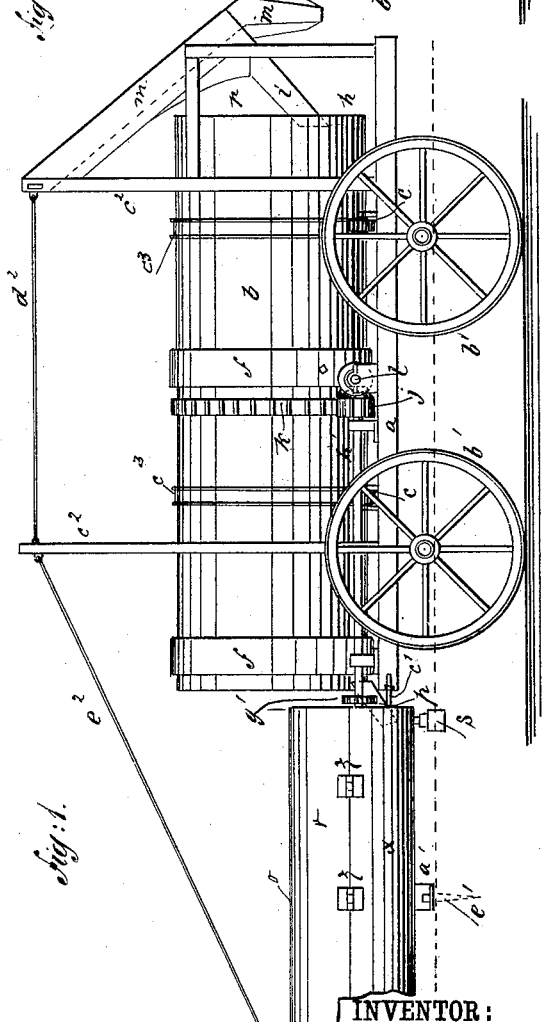
WITNESSES:
Chas. Nida.
C. Sedgwick
INVENTOR:
H. Cook
BY Munn & Co
ATTORNEYS.

(No Model.) 2 Sheets—Sheet 2.

H. COOK.
AMALGAMATOR.

No. 277,889. Patented May 22, 1883.

WITNESSES:
Chas. Nida.
C. Sedgwick

INVENTOR:
H. Cook
BY Munn & Co.
ATTORNEYS.

UNITED STATES PATENT OFFICE.

HENRY COOK, OF LEADVILLE, COLORADO.

AMALGAMATOR.

SPECIFICATION forming part of Letters Patent No. 277,889, dated May 22, 1883.

Application filed July 8, 1882. (No model.)

*To all whom it may concern:*

Be it known that I, HENRY COOK, of Leadville, in the county of Lake and State of Colorado, have invented a new and Improved Amalgamator, of which the following is a full, clear, and exact description.

My invention consists of apparatus contrived for separating the free gold from auriferous earth, whether wet or dry, without the use of water, but useful also with water, and adapted to take the gold from the powdered ore directly from stamp-mills, and also from the tailings of stamp-mills; also to save the silver, copper, &c., as is done by the present system of amalgamation. The said apparatus consists, essentially, of means for rolling and otherwise causing the earth or powdered ores to flow over and along amalgamating copper plates charged with quicksilver, in imitation of the action of water in the sluice-machines, and causing the particles of gold the earth may contain to come in contact with the charged plates, together with an arrangement of quicksilver baths for separating particles too large to be taken up by the plates, and a waste-quicksilver separator, and other details, all as hereinafter fully described.

Reference is to be had to the accompanying drawings, forming part of this specification, in which similar letters of reference indicate corresponding parts in all the figures.

Figure 5:
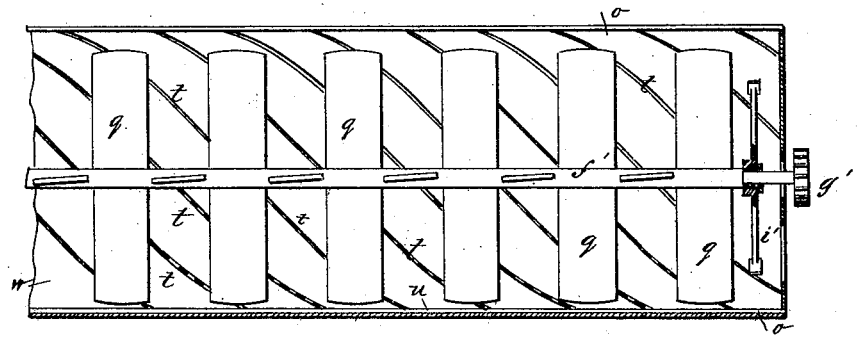
Figure 6:
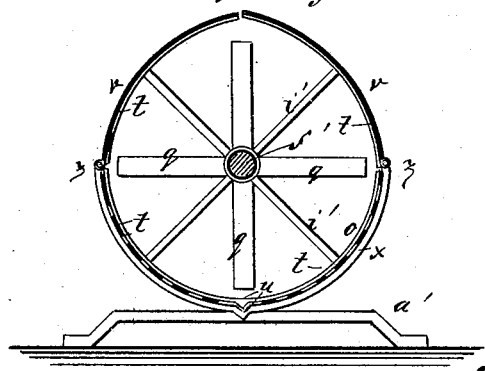
Figure 7:
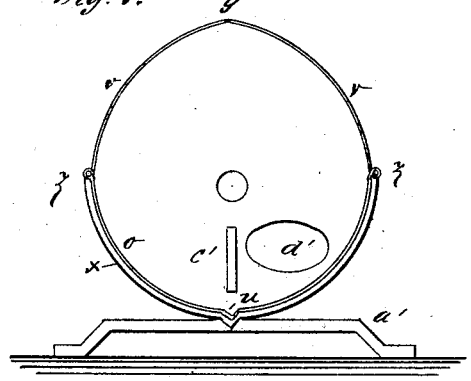
Figure 8:
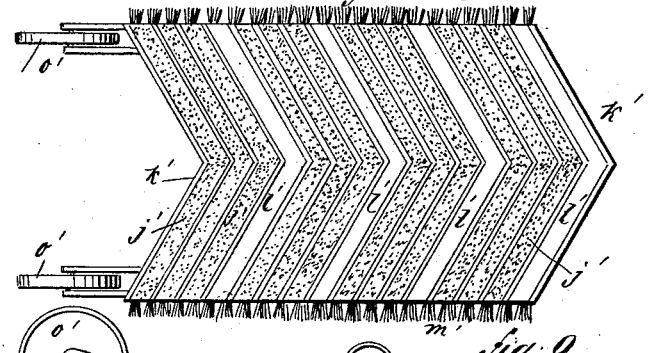
Figure 9:
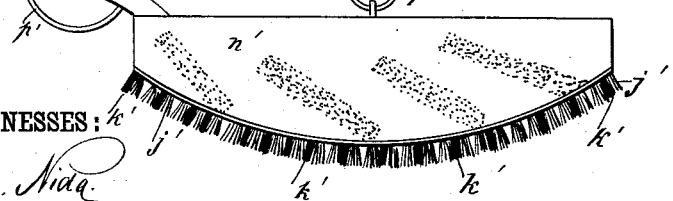

Figure 1 is a side elevation of my improved dry amalgamator. Fig. 2 is an end elevation. Fig. 3 is a longitudinal sectional elevation of a portion of the amalgamating-cylinder. Fig. 4 is partly an end elevation and partly a transverse section of Fig. 3. Fig. 5 is a longitudinal section of the waste-quicksilver-separating cylinder. Figs. 6 and 7 are end elevations of Fig. 5. Fig. 8 is a plan view of a brush for removing the amalgam from the amalgamating-cylinder inverted, and Fig. 9 is a side elevation of Fig. 8.

On any suitable bed-frame, $a$, which I prefer to mount on a wagon or truck of any approved kind for portability, I arrange a hollow cylinder, $b$, of iron, so as to rotate freely on carrier-rollers $c$ by means of flanged rings $c^3$ on said cylinder, in which I place a copper cylinder or a suitable lining of copper, $d$, having spiral flanges $e$, of copper, arranged along it from end to end, except at $f$, where I make annular enlargements of the iron cylinder for the quicksilver baths, as shown, over or inside of which I apply the scoops $g$, one of said baths being located about midway from the head $h$ of the cylinder, where the earth is fed in through spout $i$, and the other being at the opposite or tail end of the cylinder. The cylinder is made to revolve by the pinion $j$, gearing with the toothed rim $k$, and driven by power applied to to the shaft $l$. The earth or crushed ore, being fed in through the screen $m$, which separates and discharges the coarse matters at $m^2$, and suitably graduated by a slide or other means, is caused by the rotation of the cylinder to roll along the charged copper plates and flanges $d$ $e$, turning over and over, so that every particle of gold the earth may contain will come in contact with the copper and stick to it, the plates and flanges acting as riffles in a sluice-box to collect the gold. When the earth reaches the first chamber $f$, which is filled with quicksilver, all gold that is too large to stick to the charged copper is worked down and pushed by the earth into the chamber and drops into the quicksilver bath, from which the amalgam may be drawn from time to time through holes at $m$, stopped with suitable plugs.

The object of making the chambers $f$ of iron instead of copper is to prevent any quicksilver from being carried up from the baths, as would be the case if copper were used, some of which would be dropped on the scoops and carried over. By using iron for the chambers $f$ the quicksilver remains in the bottom of the chambers, and will not be so carried up and dropped.

The scoops $g$, which are of iron, are set in a circle at the lower or tail side of the chambers $f$, and project over them to the upper side, being a little higher than the cylinder, and allowing about an inch of earth on the top of the quicksilver in chambers $f$. The rest of the earth is passed along by the scoops, and after passing the second chamber $f$ at the tail-end of the cylinder, escapes, together with a percentage of waste and floured quicksilver, into what I call the "waste-quicksilver separator and indicator," consisting of a stationary hollow copper cylinder, $o$, wherein the mixed earth and waste quicksilver are beaten by the slightly spirally-arranged paddles q, which scatter it against the sides of that cylinder, in which spiral grooves t are formed, wherein the quicksilver sticks and runs down and back along a bottom groove, u, into quicksilver-tank s, where it is caught, while the earth is thrown out at the end w by the obliquely-arranged paddles, which carry it along as well as scatter it against the sides of the cylinder. The paddles only strike the earth from the bottom, where it falls from the sides of the cylinder, against which it is thrown by them. The cylinder is slightly pointed at the top, v, to cause the quicksilver lodging thereon to flow down the sides better than it would if the top were round, for some of it would drop from the center upon the paddles.

The copper cylinder o is set in an iron trough, x, for being supported, and is to be fastened in any suitable way that will allow it to be unfastened and taken out readily in case it may be required, and the upper part of it is divided at y and hinged at z, to be opened readily for cleaning or repairs. The lower part of copper cylinder o is perforated along the spiral grooves t for the escape of the quicksilver into trough u for escape below the copper along the bottom of the trough x, which is also grooved at u for the discharge of the quicksilver into quicksilver-tank s. The trough is provided with low benches a' to rest on, which, being placed on the ground, together with wheels b', let into the ground to the hubs, as indicated by the dotted line in Fig. 1, will support cylinder o suitably to be connected by lug or tenon c' by pins or bolts with frame a, so as to receive the earth from the amalgamating-cylinder through opening d' in its head by spout p, arranged in said opening. The benches a' are to be secured by stakes e', driven into the ground.

The beaters q are mounted on a shaft, f', that is to be coupled or geared at g' with a shaft, h', that is turned by pinion j, said shaft f' being supported in spiders i'.

I call this waste-quicksilver separator an "indicator," because if cylinder d should be overloaded with amalgam and any should get out, it would go into cylinder o, where, by opening the hinged doors v, it could be detected, and would indicate the necessity of cleaning out the amalgamating-cylinder d.

For collecting the amalgam from the copper cylinder d and the spiral flanges e, I provide a self-acting scraper and collectors consisting of a brush of alternate rows of bristles j' and rubber scrapers k', with spaces l', for collecting the amalgam, together with sides armed with bristles m' for brushing the sides of the copper flanges e, while scrapers j' and k' act on the copper cylinder d, said brush being mounted by its frame or block n' on wheels o', shod with rubber tires and provided with a ring, q', by which to lift it out of the cylinder d. This brush is put in between the flanges e at the head of cylinder d, and also between the two sets of scoops, and caused to travel along the grooves by rotating the drum, and thus collects the deposits on the plates and scrapes them into chambers f, from which they are to be drawn off into retorts.

The first part of the machine—that is, cylinder d—is all that will require charging with quicksilver, for the earth carries enough with it to keep the rest of the machine charged.

The machine will take the gold, silver, &c., from the tailings of stamp-mills or from the powdered ore directly from the stamps, as well as earth, wet or dry, one horse furnishing the power to work a machine of thirty cubic yards capacity per hour, doing the work better than the sluice-box, for it does not lose one color of gold, while the sluice-box does not catch more than from fifty to eighty per cent.

In charging the machine it is only required to throw a quantity of quicksilver between the flanges e or in the earth being fed into cylinder d.

I propose to apply the scoops g so they can be taken off readily to allow of a thorough cleaning of the machine. The standards $c^2$ and rods $d^2$ and $e^2$ are employed to connect the two parts of the machine together when at work.

Having thus fully described my invention, I claim as new and desire to secure by Letters Patent—

1. The combination, with the cylinder o and shaft f', having the beaters q, of the cylinder b, having toothed rim k, the shaft h', and gearing for connecting the shaft f', as shown and described.

2. An amalgamator-cylinder having enlargements at about the middle and tail end thereof, and provided with scoops g, as shown and described.

3. The cylinder having a copper lining and provided with a spiral copper flange, as and for the purpose set forth.

4. The copper cylinder o of an amalgamator, having the trough u, divided at y, hinged at z, and perforated along the spiral grooves t, in combination with a bottom-grooved supporting-trough, x, and quicksilver-tank s, as shown and described.

5. The combination, with the amalgamating-cylinder d, of a waste-quicksilver separator and indicator consisting of the copper cylinder o, having the spiral grooves described, and provided with a longitudinal groove at its bottom and a rotary beater, q, substantially as described.

6. The combination of the perforated copper cylinder o, grooved and perforated as described, rotary beaters q, and trough x, as shown and described.

HENRY COOK.

Witnesses:
W. P. THOMPSON,
W. H. RANDALL.